United States Patent [19]

Wagner

[11] 4,228,505
[45] Oct. 14, 1980

[54] METHOD FOR COMPUTED TOMOGRAPHY

[75] Inventor: Wolfgang Wagner, Hamburg, Fed. Rep. of Germany

[73] Assignee: U.S. Philips Corporation, New York, N.Y.

[21] Appl. No.: 953,512

[22] Filed: Oct. 23, 1978

[30] Foreign Application Priority Data

Nov. 30, 1977 [DE] Fed. Rep. of Germany ....... 2753260

[51] Int. Cl.² ............................................. G01N 23/00
[52] U.S. Cl. .................................. 364/414; 250/445 T
[58] Field of Search ............................. 364/414, 415; 250/445 T, 445 R, 369

[56] References Cited

U.S. PATENT DOCUMENTS

| | | | |
|---|---|---|---|
| 4,032,761 | 6/1977 | Mayo et al. | 364/414 |
| 4,063,074 | 12/1977 | Wagner | 364/414 |
| 4,070,707 | 1/1978 | Barber | 364/414 |
| 4,117,336 | 9/1978 | Bates | 364/414 X |
| 4,136,388 | 1/1979 | Lindquist | 364/414 |

*Primary Examiner*—Edward J. Wise
*Attorney, Agent, or Firm*—Thomas A. Briody; Jack Oisher; Jack E. Haken

[57] ABSTRACT

In transversal computer tomography apparatus, in which the positioning zone in which the patient can be positioned is larger than the scanning zone in which a body slice can be scanned, reconstruction errors are liable to occur. These errors are caused by incomplete irradiation of the body during examination. They become manifest not only as an incorrect image of the area not irradiated, but also have an adverse effect on the image of the other, completely irradiated areas. The invention enables reduction of these errors.

5 Claims, 11 Drawing Figures

METHOD FOR COMPUTED TOMOGRAPHY

The invention relates to a method for determining the spatial distribution of radiation absorption in a slice of a body on the basis of a plurality of measuring series, each of which represents measuring values corresponding to the integral of the absorption of the body along a plurality of parallel measuring beams which pass through the scanning zone. The various measuring series are derived from measuring beams which are oriented in different directions and the area of the slice of the body is completely scanned by the measuring beams in at least one of the directions.

A method of this kind is known, for example, from German Offenlegungsschrift 1,941,433. Therein, the absorption distribution is reconstructed from the measuring values by means of a computer utilizing known algorithms. Therein, the scanning zone is a zone which is completely irradiated from all directions. In the known arrangements for performing the method, the body must be positioned completely inside a (usually circular) scanning zone. This means that all parts of the body slice must be irradiated by the radiation in all of the measuring directions. Otherwise, as tests have shown, serious errors occur during the reconstruction of the absorption distribution, even in that part of the scanning zone which is completely covered by the measuring beams. These errors may be caused by inaccurate positioning of the body to be examined inside a positioning zone if the positioning zone is larger than the scanning zone or if the body slice has an elliptical contour whose longitudinal axis is larger than the diameter of the scanning zone.

The present invention has for its object to avoid or reduce the errors caused by the fact that parts of the body in the slice examined are not completely irradiated. This object is achieved in accordance with the invention by forming the sum of all measuring values of a measuring series and determining the difference between each sum and the maximum value of all sums. In the case where at least one of the differences thus formed deviates from the maximum a priori values are formed to complement the measuring values. Thus, for each radiation direction, the sum of the a priori values corresponds to the difference determined for that direction or, each a priori value for a direction being proportional to the length of a beam extending through the body outside the scanning zone in this direction. This length corresponding to the distance between the two points of intersection of the beam with the edge of the body (the edge being determined as the envelope of all beams which are tangent to the body inside the scanning zone or as an extension of the envelope which is determined by interpolation). The reconstruction of the absorption distribution inside the scanning zone being realized on the basis of the measuring values and the a priori values.

Thus, a priori values (i.e. values which do not follow directly from a measurement but which at least approximately represent the absorption of the body outside the scanning zone) are formed by the method in accordance with the invention. The reconstruction of the absorption distribution inside (and in given cases also outside) the scanning zone is realized on the basis of the measuring values and the a priori values. The idea of replacement of missing measuring values has been proposed (B. E. Oppenheim, "Image processing for 2-D and 3-D reconstruction from projections", Stanford University, USA, 1975), but no suitable method of determining a priori values has been described.

The invention is based on the recognition of the following:

(a) The integral over all measuring values or the sum of all measuring values in one direction (the sum of all measuring values of a measuring series) is substantially constant and independent of the direction of the beams in the case of complete scanning. "Substantially constant and independent" is to be understood to mean herein that measuring uncertainties caused by the physical nature of the measurement give rise to a small fluctuation of the integral value. This fluctuation, which may cause the integral over all measuring values to be not exactly constant, even if the body were completely scanned, is considered negligibly small hereinafter. This assumption is based on the fact that the area integral of the absorption in the slice examined is independent of the direction of the two rectangular coordinates along which the area integral of the absorption is formed. Because each measuring value represents the line integral of the absorption in a given direction, the integral over all measuring values in a direction (in the direction perpendicular thereto) is equal to the area integral of the absorption. Therefore, the sum of all measuring values in one direction (or of one measuring series) is constant and independent of the direction.

In the case of partly incomplete scanning (during which the body is completely covered by the radiation in at least one direction in the slice examined and incompletely in at least one other direction), a maximum value will be formed for the integrals of the directions in which the body slice has been completely scanned. In the other directions, smaller integral values will appear. The deviation from this maximum value in a given direction thus corresponds to the integral value or the sum of the a priori values for that direction.

(b) Examinations using arrangements of the described kind have shown that the X-ray absorption by tissue varies within only narrow limits in major parts of the human body. Therefore, it may be assumed that the absorption inside the body is constant for a given direction along all beams situated outside the scanning zone.

(c) The outer edge of the human torso and the head may be represented as a closed and smooth curve. For body parts which are situated inside or at the edge of the scanning zone, the position of the outer edge can be directly derived from the measuring values as an envelope of all measuring beams tangent to the edge of the body. For the parts of the body which remain outside the scanning zone, the position of the edge curve can be approximated by interpolation. The length of the beams passing through the body which are assumed to be situated outside the scanning zone is thus approximately fixed. The a priori values can be calculated on the basis thereof.

An embodiment of the invention will be described in detail hereinafter with reference to the drawing.

Figure 1:
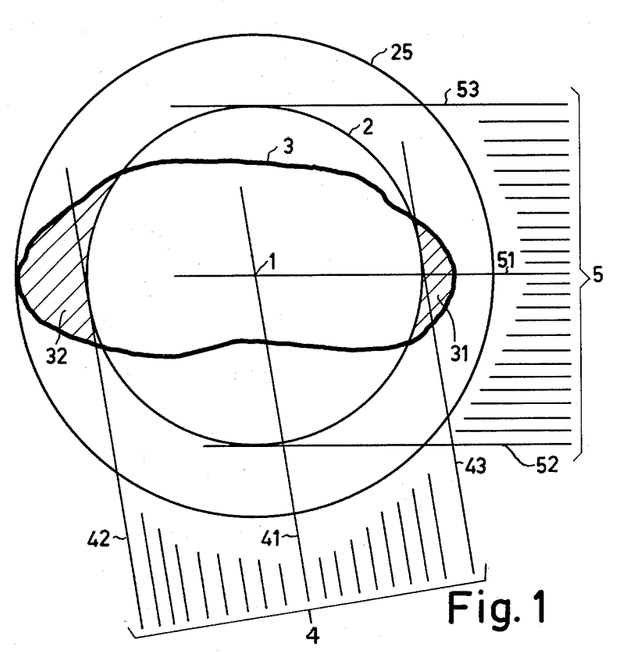
FIG. 1 is the geometrical arrangement of a slice of a body with respect to a scanning zone and a positioning zone.

FIG. 1 shows a circular scanning zone 2, having a center 1, which is generally also the center of rotation of a system formed by a radiator/detector. The radiator, the detector, motors and drives and all other mechanical parts are not shown; but may be of the same construction as in known apparatus for computer tomography (for example, the apparatus described in German Auslegeschrift 1,941,433). The parts 31 and 32 of a body 3 to be examined are situated outside the scanning zone 2, but inside a positioning zone 25 which is assumed to be circular and concentric to the scanning zone 2. The outer contour of the body shown in FIG. 1 corresponds to a section through the upper thorax and the shoulder bones. Measuring beams 4 and 5 (which are the beams or strips along which absorption is determined as a measuring value), belonging to two different series, are shown by way of example. These beams irradiate the scanning zone at different angles. The central beams passing through the center 1 of the scanning zone 2 are denoted by references 41 and 51, while the other measuring beams which are tangent to the scanning zone are denoted by references 42, 43 and 52, 53, respectively. It can be seen that the measuring series denoted by the reference 5 completely covers the body 3 but that the measuring series 4 does not completely cover the body 3 (the shaded areas 31 and 32 are not covered).

Figure 2:
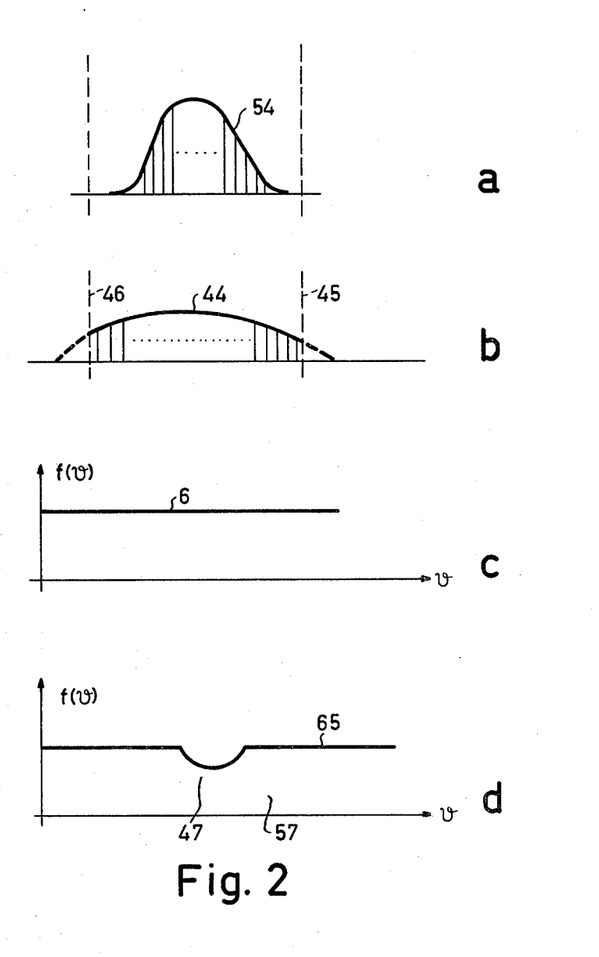
FIGS. 2a and 2b are the variation of the measuring values of a measuring series.
FIGS. 2c and 2d are the sum of the measuring series as a function of the irradiation direction for a completely scanned body and for a partly incompletely scanned body.

The FIGS. 2a and 2b show profiles 54 and 44, respectively, of the measuring values Q(θ, p) measured by the measuring series 5 and 4. (Q(θ, p) indicates that each measuring value is a function of the direction θ in which the measuring beam irradiates the body during the determination of the measuring value (this direction being the same for all measuring values of a measuring series) and also a function of the position p of a measuring beam with respect to a straight line extending perpendicularly to the beam direction or the distance between the relevant measuring beam and the scanning center (the measuring beams which are situated at the left and the right at the same distance from the centre having an opposed sign). It appears from the FIGS. 2a and 2b that the profile 54 varies gradually, while the profile 44 abruptly goes to the value zero at the edges 45 and 46 where it represents the measuring values along the outer measuring beams 42 and 43. Each of the measuring values represented by one of the profile curves 44 and 45 can be calculated in known manner according to the formula:

$$Q(\theta,p) = \int_{-\infty}^{\infty} \mu(x,y)ds \quad (1)$$

in which Q(θ,p) is the measuring value determined along the measuring beam having the direction θ and the distance p from the scanning center, and μ(x,y) is the absorption of the body slice at the point (x,y) in a fixed rectangular system of coordinates. The quantity s is a coordinate extending in the direction of the measuring beam.

When the integral f(θ) over all measuring values of a measuring series is formed, the following is obtained:

$$f(\theta) = \int_{-\infty}^{\infty} Q(\theta,p)dp = \int\int_{-\infty}^{+\infty} \mu(x,y)dp\,ds \quad (2)$$

in which p and s are coordinate systems rotated in synchronism with θ and having a fixed coordinate origin (=scanning center 1). Because this integral f(θ) corresponds to the area integral over the absorption of the body in the plane of examination, which is independent of the direction θ, as has already been stated, this independence must also be applicable to f(θ), so that for the completely scanned body the variation 6 (FIG. 2c) of the function f(θ) is independent of θ (i.e. f(θ) is a constant=A. This relation is applicable whenever the measuring value Q(θ,p) is proportional to the line integral of the absorption in the direction θ along a measuring beam having the distance p. This property, assumed to be a given factor hereinafter, can be obtained in known manner, for example, by forming the logarithm of the intensity ratio of the non-attenuated measuring beam and the measuring beam attenuated by the body. Furthermore, the integral f(θ) is not in practice formed by a real integration but rather by the summing of all measuring values of a measuring series. However, this does not affect the validity of the considerations underlying the present invention.

For a measuring series which does not completely cover the body 3, f(θ) must be smaller than the constant:

$$f(\theta) = \int_{-R}^{+R} Q(\theta,p)dp < A \quad (3)$$

Therein, R is the radius of the scanning zone and A is the previously mentioned constant. During an examination involving partly incomplete scanning of the body (i.e. during an examination where the body is completely scanned by some measuring series, while it is not completely scanned by other series), the constant A is the maximum of the various values f(θ):

$$A = \text{Max}_\theta \{f(\theta)\} \quad (3a)$$

FIG. 2d shows, by way of example, the variation 65 of the integral value f(θ) for the case (shown in FIG. 1) concerning partly incomplete scanning, the references 47 and 57 denoting the direction of the measuring beams in the measuring series 4 and 5, respectively.

Equations (3) and (3a) are used in accordance with the invention to establish whether the case of partly incomplete scanning occurs and for calculating the integral value K(θ) of the a priori values Q* (p,θ) to be complemented. This is because:

$$K(\theta) = \int_{-\infty}^{-R} Q^*(\theta,p)dp + \int_{R}^{+\infty} Q^*(\theta,p)dp = A - f(\theta) \quad (4)$$

If K(θ) is larger than zero, this is only proof of incomplete scanning if no errors have occurred in the various measuring series. On the other hand, in the case where it has been ascertained that the body has been completely scanned, an error (caused, for example, by movements of the body or fluctuations of the detector sensitivity) may be assumed when $K(\theta)$ is larger than zero.

When it can be assumed, as has already been mentioned, that the absorption at the edge of the body deviates only slightly from a mean value, equation (4) can be used to determine the a priori values in the regions 31 and 32 (FIG. 1) outside the scanning zone, provided that the surface area of the body outside the zone is known. In that case, the following must be applicable for each a priori value $Q^*(\theta,p)$:

$$Q^*(\theta,p) = C(\theta) \cdot L(\theta,p) \tag{6}$$

Therein, $C(\theta)$ is a proportionality factor and $L(\theta,p)$ is the length, yet to be determined, of an (assumed) beam which irradiates the body outside the scanning zone but inside the body. The following is then obtained in combination with the equation (4):

$$K(\theta) = C(\theta) \cdot \left[ \int_{-\infty}^{-R} L(\theta,p)dp + \int_{R}^{\infty} L(\theta,p)dp \right] \tag{7}$$

Therefore, when the lengths $L(\theta,p)$ have been determined (as will be described hereinafter) the factors $C(\theta)$, being constant for a direction $\theta$, and hence the a priori values $Q^*(\theta,p)$, can be calculated by way of the relations (4), (6) and (7). For the determination of $L(\theta,p)$, the invention utilizes the fact that the body slice generally has a closed, smooth and substantially convex contour. This body edge can be described by a series of central vectors $r(\phi)$, where:

$$/r(\phi)/ = \sqrt{(x^2(\phi) + y^2(\phi))} \tag{8}$$

Therein, $x(\phi)$, $y(\phi)$ is the point of intersection of a central beam, which originates from the center 1 of the scanning zone in the direction $\phi$, and the edge of the body. When the vector lengths $/r(\phi)/$ are used as a function of $\phi$, a substantially gradual curve is obtained.

Figure 3:
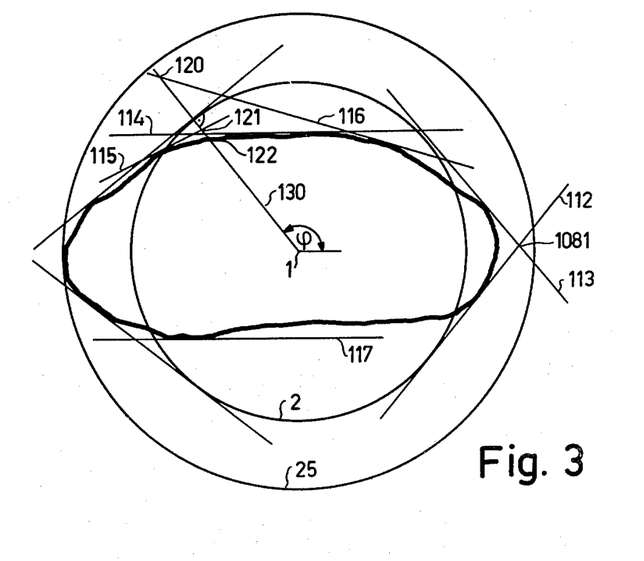
FIG. 3 is an example of the determination of a central vector.

For determining the edge of the body, the beams $p_3$ and $p_4$ (see the beams 114 ... 117 in FIG. 3) which are tangent to the edge of the slice of the body examined must first be determined. For these (measuring) beams, the following is applicable in the interval between $p_3$ and $p_4$:

$$Q(\theta,p) > 0 \text{ or}$$

$$Q(\theta,p) = 0 \text{ outside the interval } [p_3, p_4] \tag{9}$$

FIG. 3 shows the points of intersection of a central beam 130, extending in the direction $\phi$, and the tangential beams 114, 115 and 116 thus established, said points being denoted by the references 120, 121 and 122. It can be seen that the point of intersection 122, being situated at the smallest distance from the center 1, substantially coincides with the edge of the body. This relation can be generalized:

$$/r(\phi)/ = \text{Min}\theta \left\{ \sqrt{x^2(\phi,\theta) + y^2(\phi,\theta)} \right\} \tag{10}$$

in which $x(\phi,\theta)$ and $y(\phi,\theta)$ are the points of intersection of the central beam extending in the direction $\phi$ and the beams extending in the direction $\theta$ and being tangent to the body; for $x(\phi,\theta)$ and $y(\phi,\theta)$:

$$x(\phi,\theta) = p_3(\theta) \cdot 1/(\sin\theta \cdot \text{tg}\,\phi + \cos\theta) \tag{11}$$

$$y(\phi,\theta) = p_3(\theta) \cdot 1(\sin\theta + \cos\theta \cdot \text{tg}\,\theta)$$

(Therein, $\theta$ is defined as the angle between a straight line which horizontally extends to the right from the center 1 and the perpendicular from the center to the tangentially extending beam).

In order to prevent successive errors during the determination of the vectors $r(\phi)$ in the case where for the value of $p_3 = R$ and/or the value of $p_4 = -R$, a beam direction, whilst for this beam direction $K(\theta) > 0$, the relation (9) must be completed by $$p_3 = +R_0 \text{ or } p_4 = -R_0 \tag{9a}$$

Figure 4:
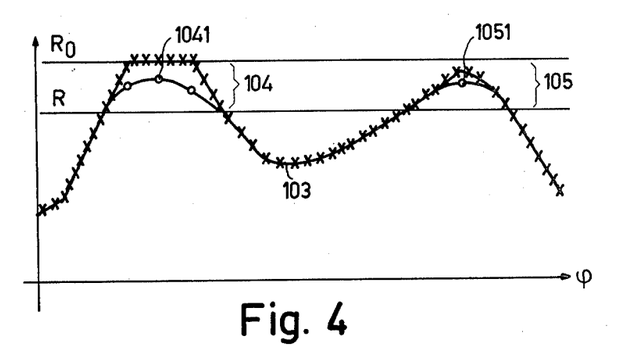
FIG. 4 is the variation of the central vectors as a function of the polar angle φ.

Therein, $R_0$ is the radius of the positioning zone 25 (see FIG. 1) and the sign of $R_0$ depends on the position of $p_3$ or $p_4$ (to the right or the left) with respect to the center ab. For the configuration shown in FIG. 3, the variation of the central vectors $/r(\phi)/$ as a function of $\phi$ as shown in FIG. 4 is thus obtained. The reference 104 denotes the vectors $r(\phi)$ which correspond to the edge of the body outside the scanning zone at the left. In accordance with the equations (9a), (10) and (11), the maximum vector length is limited to approximately $R_0$. The reference 105 denotes the vectors $r(\phi)$ which correspond to the edge of the body outside the scanning zone 2 at the right. Because the point of intersection 1081 (FIG. 3) is in this case situated inside the contour 25 of the recording device, the vector lengths are not limited. The references 1041 and 1051 in FIG. 4 represent the variation of the true vector lengths $/r(\phi)/$ in accordance with the relation (8).

In order to reduce the difference between the two curves, and hence the errors in the determination of $r(\phi)$, the vector lengths determined in accordance with the equation (10) are replaced by other values $r^*(\phi)$, where:

$$r^*(\phi) = r(\phi_1) \cdot a_1 + r(\phi_{-1}) a_2 + r(\phi_2) \cdot a_3 + r(\phi_{-2}) a_4 + \ldots \tag{10a}$$

The interpolation in accordance with the equation (10a) is performed whenever $/r(\phi)/$, determined in accordance with equation (10), has a value which is larger than the radius R of the scanning zone. In this respect, use is made of values $r(\phi_1) \ldots r(\phi_2)$ which are smaller than or at the most equal to R, their angular positions $\phi_1 \ldots \phi_2$ being nearest to the position $\phi \cdot a_1, a_2, a_3, a_4 \ldots$ are interpolation coefficients which are fixed in accordance with known interpolation methods; for the angle $\phi: \phi_{-2} < \phi_{-1} < \phi_1 < \phi_2$. The edge of the body 3 is thus approximately determined by the vectors $r(\phi)$ or $r^*(\phi)$.

Using $r(\phi)$ and $r^*(\phi)$, the lengths $L(\theta,p)$ can be calculated as the distance between two points of intersection $(x_1, y_1)$ and $(x_2, y_2)$ of a beam which extends outside the scanning zone in the direction $\phi$, having the position $p > R$, and the edge of the body 3. In this respect:

$$L(\theta,p) = \sqrt{(x_1 - x_2)^2 + (y_1 - y_2)^2}$$

where $$x_1 = /r(\phi')/ \cdot \cos\phi', \quad x_2 = /r(\phi'')/ \cdot \cos\phi'' \quad (12)$$

$$y_1 = /r(\phi')/ \cdot \sin\phi', \quad y_2 = /r(\phi'')/ \cdot \sin\phi''$$

The polar angles $\phi'$ and $\phi''$ of the two central vectors, terminating in the said points of intersection, are determined in accordance with the following condition:

$$/p/\cos(\theta - \phi') - /r(\phi')// < \epsilon$$

or $$/p/\cos(\theta - \phi'') - /r(\phi'')// < \epsilon$$

Therein, $\epsilon$ is a small value in comparison with the radius R of the scanning zone, for example, $\epsilon = R/100$. The angle $\phi$ is then varied until the relation (13) is satisfied.

Figure 5:
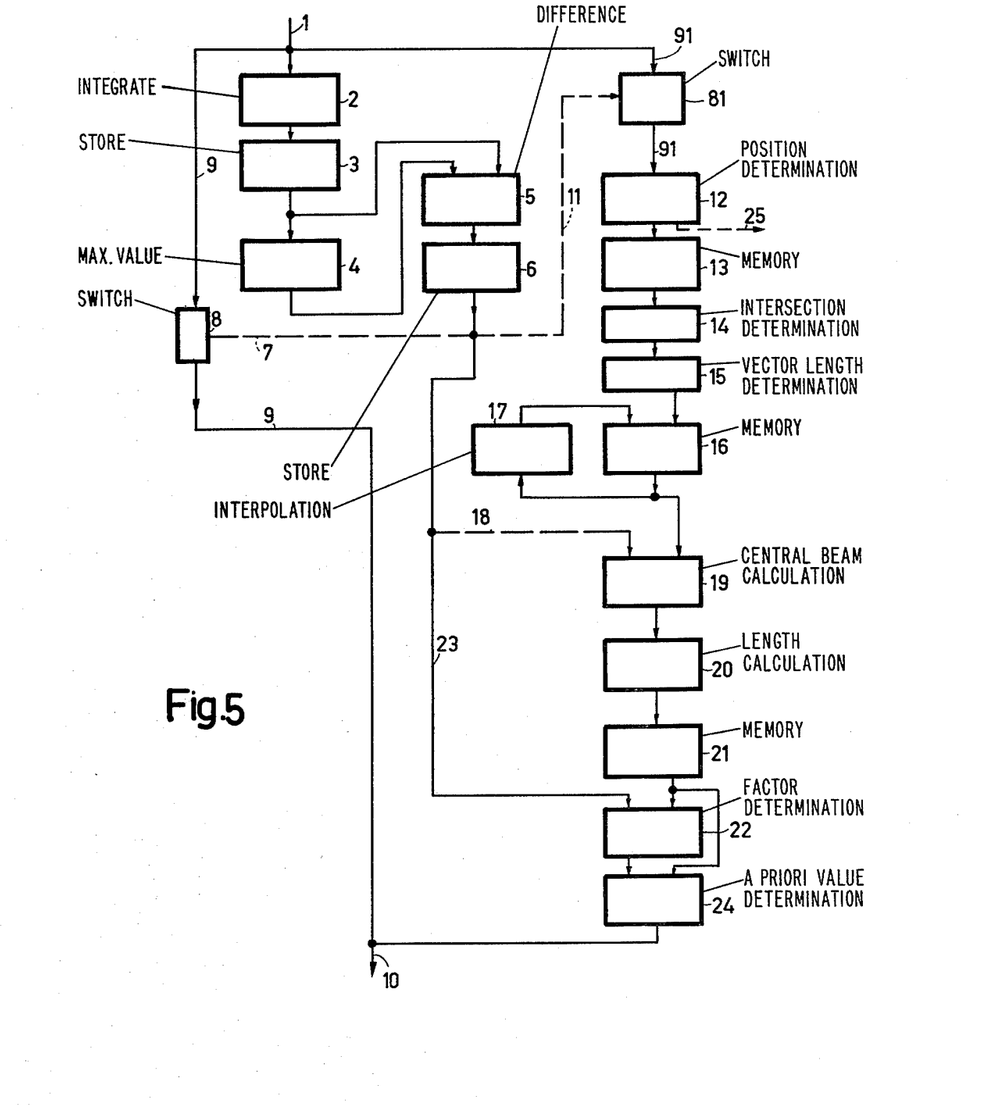
FIG. 5 is an arrangement for performing the method in accordance with the invention, FIGS. 6a and b show the variation of the measuring values and the a priori values.

Hereinafter, the calculation process will be described for performing the method in accordance with the invention by means of a computer which is diagrammatically shown in FIG. 5. The measuring values $Q(\theta,p)$ arrive from a memory (not shown), via the data line 1, in an arithmetic unit 2 in which the integral or the sum of all measuring values $f(\theta)$ is formed in accordance with the equation (3) for each measuring series (i.e. for each $\theta$). The values $f(\theta)$ thus calculated are stored in the memory 3. The arithmetic unit 4 determines, in accordance with the equation (3a), the maximum value A of the values stored in the memory 4. The arithmetic unit 5 determines, on the basis of the values $f(\theta)$ stored in the memory 3 and the maximum value A calculated in the arithmetic unit 4, the differences $K(\theta)$ in accordance with the equation (4) and stores these values in the memory 6. From this memory a line 7 extends to the switch 8 which releases path 9 for the measuring values $Q(\theta, p)$ when all differences $K(\theta)$ are 0 or smaller than a predetermined low threshold value. The measuring values $Q(\theta,p)$ can then be applied, without further modification, via the line 10, to the known arithmetic (not shown) for determining the absorption. At the same time, all further calculations in the arithmetic units 12 to 24 are stopped via line 11.

However, in the case of partly incomplete scanning, so that at least one value $K(\theta) > 0$ exists, switch 81 is closed via the line 11, so that the measuring values $K(\theta, p)$ can be applied to the arithmetic unit 12 via the line 91. This unit then determines, for all directions $\theta$, the positions of the (measuring) beams which are tangent to the body by means of the equations (9) and (9a) and stores these data in the memory 13. The points of intersection $x(\phi,\theta)$, $y(\phi,\theta)$ for all beam directions $\theta$ and preferably 360 equidistant directions $\theta$ of central beams are determined in arithmetic 14 in accordance with the relation (11). The arithmetic 15 then determines, by way of the relation (10), the vector lengths $/r(\phi)/$ and stores these data in the memory 16. The interpolation in accordance with the relation (10a) is performed in the arithmetic unit 17. If the value $K(\theta)$ becomes larger than 0 for a given beam direction $\theta$ (which implies that the body was not completely scanned in the direction $\theta$), the completion of the calculation process in the arithmetic unit 19 is enabled via the line 18, said unit calculating, using the equation (13), for all beam positions $R \leq /p/ \leq R_0$, the central beams $r(\phi')$ and $r(\phi'')$ whose end points $(x_1, y_1)$ and $(x_2, y_2)$, respectively, are situated on the beam of the position p. If such end points exist, i.e. if the beam in the position p intersects the edge curve of the body, the associated length $L(\theta, p)$ is calculated in the arithmetic unit 20 in accordance with equation (12).

For beams which are situated outside the scanning zone and outside the edge curve of the body, and also for all beam directions $\theta$ for which the calculation is not enabled in the arithmetic unit 19 (because the body is completely scanned in the direction $\theta$, so that $K(\theta) = 0$), the arithmetic unit 20 produces $L(\theta, p) = 0$. All values $L(\theta, p)$ are stored in the memory 21. The values $K(\theta)$ made available via the line 23 are used in the arithmetic unit 22, in conjunction with the values $L(\theta, p)$ stored in the memory 21, for determining the factor $c(\theta)$ in accordance with the relation (7). On the basis thereof, the arithmetic unit 24 determines the a priori values $Q^*(\theta, p)$ to be complemented and applies these values to the arithmetic unit (not shown) for determining the absorption.

Finally, it is to be noted that in the case of incomplete scanning in all beam directions $\theta$, (i.e. in the case where a measuring value deviating from zero was determined for all beam directions at at least one edge of the scanning zone ($Q(\theta, R))$ or $Q(\theta, -R) > 0$)) the arithmetic unit 12 provides an indication, via the line 25, on a data display (not shown) that perfect determination of the absorption is not possible in these circumstances. The arrangement shown in FIG. 5 can be realized by way of known digital computer components.

Figure 6A:
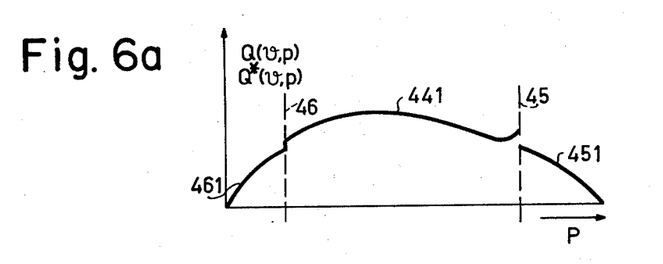
Figure 6B:
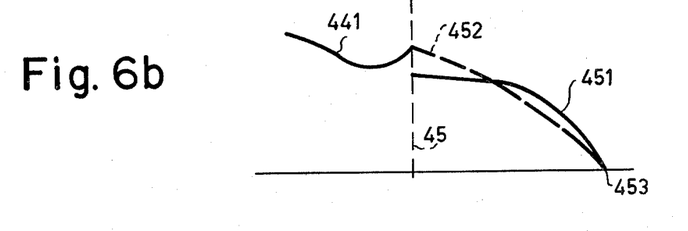

The method in accordance with the invention can be further refined. For example, FIG. 6a shows a measuring value profile complemented by a priori values $Q^*(\theta,p)$ 451 and 461. As is clearly shown, at the boundaries 45 and 46 between the curve 441 which represents the measuring values $Q(\theta,p)$ and the curves 451 or 461 which represent the a priori values $Q^*(\theta, p)$ an irregularity is present which may be caused, for example, if the circular scanning zone has intersected a part of the body having a higher absorption. In order to prevent such irregularities and to ensure that instead of the profile variation 451 a variation like 452 (FIG. 6b) is obtained, the values $Q^*(\theta, p)$ are corrected by interpolation in an improved arrangement:

$$Q^{**}(\theta, p) = \Delta Q(\theta, R) \cdot b_p + Q^*(\theta, p) \cdot C_2(\theta) \quad (14)$$

Therein, $b_p$ is a weighting factor for which:

$$b_p = 1 \text{ for } p = R \text{ and } b_p = 0 \text{ for } p > R \text{ and for } Q^*(\theta, p) = 0.$$

The factor $C_2(\theta)$ is chosen so that the area integral under the curve 451, representing the values $Q^*(\theta, p)$, is equal to the area integral under the curve 452 which represents the corrected values $Q^{**}(\theta, p)$. As a result, it is ensured that the integral over all values associated with a given beam direction $\theta$ is constant (= the maximum value A). The value $$\Delta Q(\theta, R) = Q(\theta, R) - Q^*(\theta, R) \cdot C_2(\theta) \quad (15)$$

is then defined as the difference between the measuring value $Q(\theta, R)$ at the edge of the scanning zone and the modified a priori value $Q^*(\theta, R)$ along the measuring beam $p = R$ and is added, weighted by $b_p$, to the a priori values in order to ensure a smooth transition at the area $p = R$ (45 in FIG. 6).

A further improvement can be achieved when the vectors $r(\phi)$ determined in accordance with the equation (10) are taken into account, in contrast with the conditions described with reference to the equation (10a), also for calculating the edge of the body in accordance with the equations (12) and (13) when $/r(\phi)/>R$, subject to conditions which will be explained hereinafter. As a result, the number of vectors which are to be replaced by interpolated values $r'(\phi)$ is reduced, so that the edge of the body can be more accurately determined.

Figure 7:
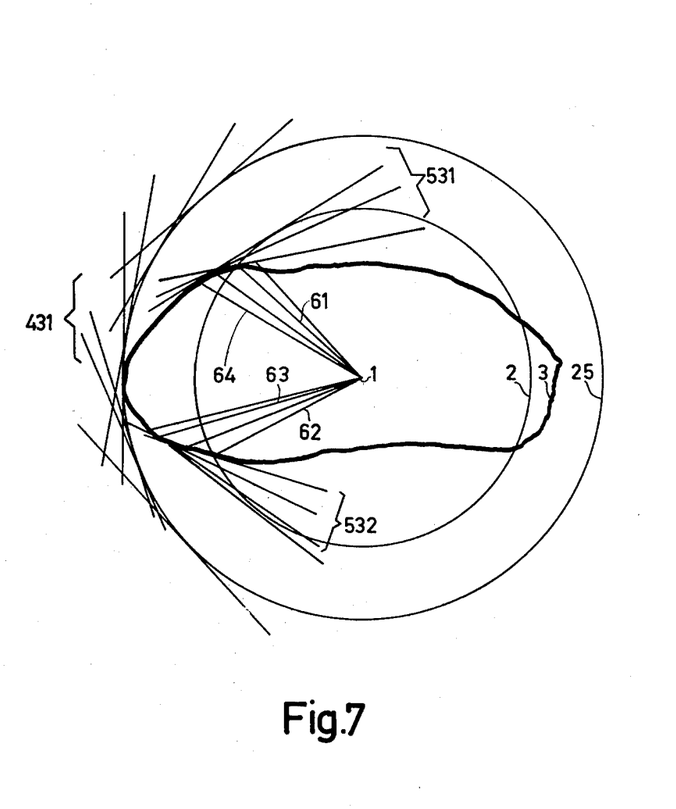
FIG. 7 is the geometrical arrangement of an incompletely scanned body.

For an explanation of the required conditions, the beam positions calculated in accordance with relation (9) are shown in FIG. 7 for various beam directions $\theta$. Therein, 531 and 532 denote groups of beams which extend through the scanning zone, and the reference 431 denotes a group of beams which extends outside the scanning zone and which is made equal to $R_0$ in accordance with the equation (9a), the length of the vectors 61 and 62 corresponding exactly to the radius R of the scanning zone 2. It can be seen that there are also vectors whose length exceeds the radius of the scanning zone, for example, the vectors 63 and 64 which correctly describe the body edge. However, not all vectors between the vectors 63 and 64 are suitable for describing the edge of the body 3, so that they must be replaced by interpolation in accordance with the equation (10a). In order to determine in which angular region of $\theta$ the central vectors must be replaced by interpolation, use can be made of the fact that a gradually monotonously decreasing or increasing relationship exists between the angle $\phi$ of the central vector and the angle $\theta$ of the measuring beam on which the central vector terminates in a body which is convex in the plane of examination. Therefore, when the determined central vector equals the radius $R_0$ of the positioning zone, or when the central vector terminates each time on the same measuring beam (p=R) extending at the outer edge of the scanning zone 2, the value of $R(\phi)$ must be determined by interpolation in accordance with the equation (10a).

The method in accordance with the invention can also be used for scanning systems in which a group of diverging beams simultaneously completely scans the body, because groups of beams of this kind can be rearranged to form groups of parallel beams by known methods. Scanning systems of this kind are referred to as third-generation scanners; the scanning zone is then completely irradiated by a fan-shaped radiation beam which originates from the radiator. Similarly, the method in accordance with the invention can also be used for so-called second-generation scanners. It is also to be noted that the method in accordance with the invention is not only suitable for determining the absorption of Xx-radiation, but also for the determination of the distribution of the emission of gamma-radiation utilizing a so-called radionuclide scanner.

What is claimed is:

1. A method for determining the spatial distribution of the absorption of radiation in a slice of a body comprising the steps:
    irradiating the body from a plurality of different positions along a plurality of measuring beams which pass through a scanning zone, the slice of the body being completely irradiated by radiation from at least one of the positions and being less than completely irradiated by radiation from at least one other of the positions;
    measuring the integral of the absorption of radiation by the body along each of the measuring beams to produce measuring values, a measuring series comprising the set of all measuring values produced by radiation from a single position;
    forming the sum of the measuring values in each of the measuring series;
    identifying the maximum of all of said sums;
    determining the difference between each of said sums and the maximum sum;
    forming, in the case where at least one of the differences deviates from zero, a priori values so that for each measuring series the sum of the associated a priori values corresponds to the difference between the sum formed for that series and the maximum sum, each a priori value being proportional to the length of a beam extending through the body from the corresponding position, which length corresponds to the distance between the points of intersection of the associated beam and the edge of the body, said each being determined as the envelope of all beams which are tangent to the body inside the scanning zone and as an extension of the body which is determined by interpolation; and
    reconstructing the absorption distribution inside the scanning zone, by the methods of computed tomography, utilizing both the measuring values and the a priori values.

2. A method as claimed in claim 1 further comprising the steps of determining which of the measuring beams are tangent to the body by:
    examining the measuring values to identify which of the measuring beams, starting from the center of the scanning zone, first produces a measuring value at approximately zero while all measuring beams originating from the same position which are situated further from the center of the scanning zone also produce measuring values of zero; and
    storing a value associated with the position of the identified beam.

3. A method as claimed in claim 1 wherein the envelope is formed as a progressive series of central vectors which connect the points of intersection of the central beam extending from each position in the direction of a central vector and the beams tangent to the body which are situated at the smallest distance from the center of the scanning zone.

4. The method of claim 3 wherein the central vectors are formed for a finite number of angular positions which are uniformly distributed over a complete circle.

5. A method as claimed in claim 3 wherein the scanning zone is circular and further comprising the step of replacing all central vectors whose length is equal to or larger than the radius of the scanning zone with new vectors which are determined by interpolation from the nearest adjoining central vectors whose lengths are smaller than the radius of the scanning zone.

* * * * *